Oct. 18, 1960

A. B. CADY 2,956,523

OVEN HEATING SYSTEM

Filed Nov. 7, 1957

INVENTOR.
Arthur B. Cady
BY
Otto Moeller
Attorney

Oct. 18, 1960 A. B. CADY 2,956,523
OVEN HEATING SYSTEM
Filed Nov. 7, 1957 3 Sheets-Sheet 2

INVENTOR.
Arthur B. Cady
BY
Otto Moeller
Attorney

Oct. 18, 1960

A. B. CADY 2,956,523

OVEN HEATING SYSTEM

Filed Nov. 7, 1957

*INVENTOR.*
Arthur B. Cady
BY
Otto Moeller
Attorney

United States Patent Office 2,956,523
Patented Oct. 18, 1960

2,956,523

OVEN HEATING SYSTEM

Arthur B. Cady, York, Pa., assignor to Capitol Products Corporation, Mechanicsburg, Pa., a corporation of Pennsylvania Filed Nov. 7, 1957, Ser. No. 695,020

3 Claims. (Cl. 107—63)

This invention relates to bakery ovens, and more particularly to an indirect heating system of the recirculating type for a double lap oven.

In such ovens the products to be baked make a number of passes lengthwise through the oven baking chamber, the products being charged onto the trays of an endless tray conveyor adjacent the front end of the oven, and being commonly discharged from the trays at the same end. It is customary to provide at one end of the oven a source of hot combustion gases with longitudinally extending flues extending from said source to the opposite end of the oven, with return flues leading back again. Because of the temperature drop of the combustion gases as they pass through the flues, difficulty is experienced in maintaining the desired temperature in the part of the oven opposite the entrant end of the hot combustion gases. An object of the present invention is to provide an improved heating system adapted to effect an even distribution of heat from front to back of the oven. The heating system includes a heating unit at each end of the oven provided with independent recirculating flue systems, the flues leading from the one heating unit and return flues thereto extending lengthwise through the oven in a direction opposite the corresponding flues leading from the other heating unit and return flues thereto, whereby an even distribution of heat from front to back of the oven is provided. By appropriate regulation of the heating units, more or less heat may be supplied to one end or the other of the oven, as desired.

Another object is to provide in an oven of the double lap type, a heating system by virtue of which the products to be baked are subjected to a higher degree of heat during their initial passes through the oven than during their final passes therethrough. It is in the initial passes of the products that a greater degree of heat is needed to raise the temperature of the products to a point for setting the products and accomplishing the main baking operation. To accomplish this a bank of flues subjacent the first pass through the oven of the products to be baked, are arranged to receive the hot combustion gases from the heating unit at the loading end of the oven, and a bank of flues subjacent the second pass through the oven of the products to be baked is arranged to receive the hot combustion gases from the heating unit at the opposite end of the oven; while the return banks of flues through which pass the reduced temperature combustion gases are disposed subjacent the final passes of the products through the oven.

A further object of the invention is to provide a heating system wherein the hot combustion gases from the one heating unit are introduced into the bank of flues subjacent the first pass of the products through the oven at the head end of said first pass, and the hot combustion gases from the other heating unit are introduced into the bank of flues subjacent the second pass of the products through the oven at the head end of said second pass, so that the hot combustion gases flow through said banks of flues in the direction of movement of the products along the passes associated with said respective banks of flues, whereby the products to be baked at their start along each of the first two passes are subjected to the highest temperatures where such highest temperatures are needed to rapidly raise and maintain the products at baking temperature.

Additional objects of the invention reside in the provision of a heating medium circulating system as above described that materially reduces the baking time and improves the baking characteristics of the oven.

The foregoing objects and advantages of the present invention, together with other incidental objects and advantages thereof which will become apparent, may be attained with the exemplary embodiment of the invention which is described in detail hereinafter and which is illustrated in the accompaning drawings.

Referring to the drawings.

Figure 1:
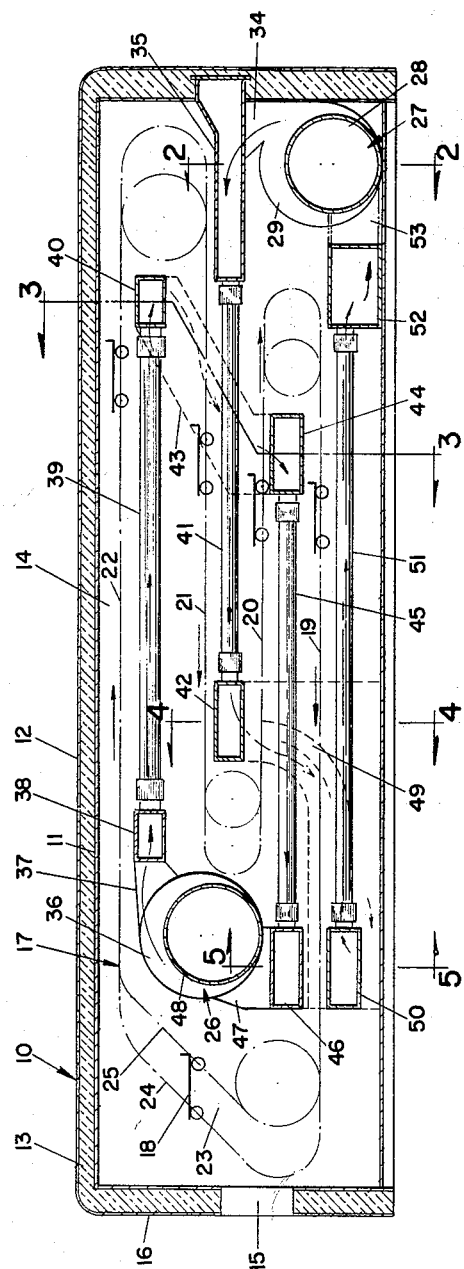
Figure 1 is a longitudinal vertical sectional view of an oven embodying the invention.

The oven 10 illustrated in the drawings, is of generally rectangular shape, including spaced inner and outer sheets 11 and 12, between which walls is interposed suitable insulating material 13. The said walls enclose a baking chamber 14 into which the products to be baked are introduced through an opening 15 in the oven front wall 16.

The oven 10 is of the type commonly referred to as a double lap oven. In other words, the endless tray conveyor 17, traveling in the direction of the arrows in Figure 1, conveys the trays 18 through the baking chamber 14 in an upper and a lower lap along along the superimposed longitudinally extending runs 19, 20, 21 and 22 of the endless tray conveyor 17. The trays are conveyed through the upper lap along run 22 from the front to the rear portion of the oven and along run 21 from the rear back to the front portion thereof, and through the lower lap along run 20 from the front to the rear portion of the oven and along run 19 from the rear back to the front portion thereof. An upstanding run 23 connects the forward ends of the runs 19 and 22 to complete the circuit of the trays through oven baking chamber 14.

The tray conveyor 17, illustrated rather diagrammatically in Figure 1, may be of any suitable form well known in the art, and includes endless chains 24 and 25, one at each side of the oven, with one chain offset forwardly of the other, chain 24 being offset forwardly of chain 25, as shown in Figure 1. The chains 24 and 25 follow a circuitous path through the oven along the runs 19, 20, 21, 22 and 23, and at the turns from one run to the other, the chains 24 and 25 are trained over suitable sprockets and guide shoes in a manner well known in the art. Supported between the chains 24 and 25 are a multiplicity of transversely extending equidistantly spaced trays 18, a limited number of which only are shown in Figure 1 to indicate the path followed by trays in their circuitous path through the oven. A front corner of each tray is pivotally connected to the forwardly offset chain 24, while the diagonally opposite rear corner of each tray is pivotally connected to the rearwardly offset chain 25, whereby the trays always assume an upright supporting position as they follow the circuitous path through the oven. The forward end of the tray conveyor 17 is arranged to travel in close proximity to the oven opening 15, through which opening the trays 18 may be loaded and unloaded manually or by suitable mechanical means.

Figure 2:
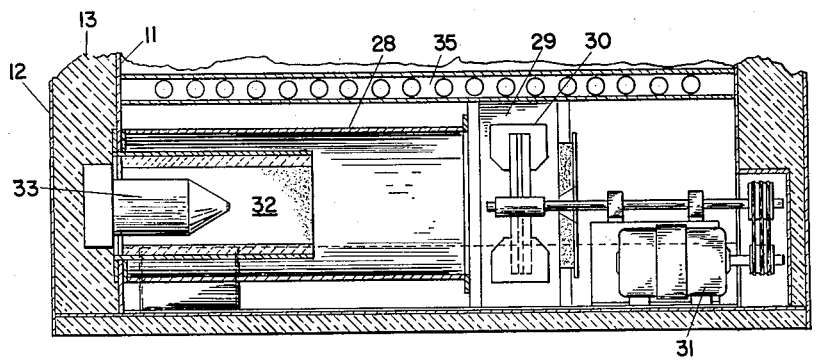
Figure 2 is an enlarged sectional view taken on line 2—2 of Figure 1.
Figure 3:
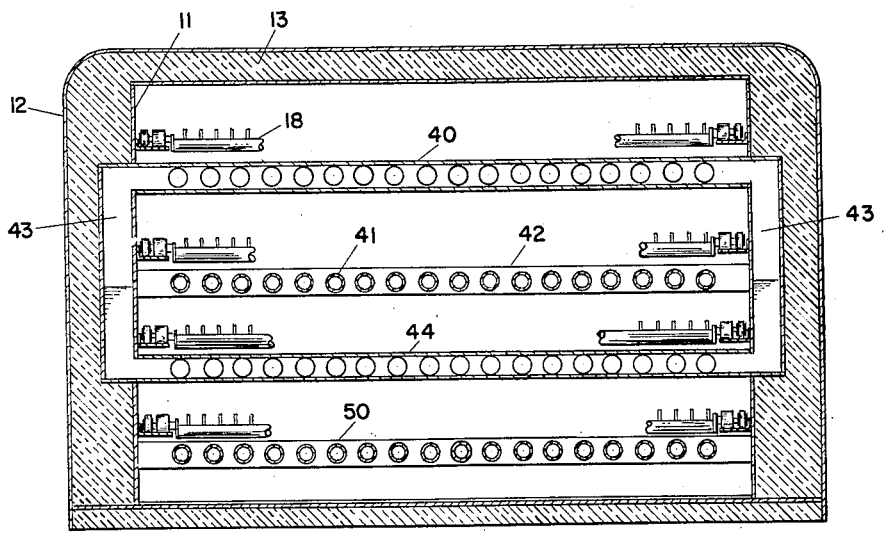
Figure 3 is an enlarged sectional view taken on line 3—3 of Figure 1.

The heating system of the invention includes a heating unit 26 in the upper forward portion of the oven and a heating unit 27 in the lower rearward portion of the oven. The heating units 26 and 27 are similar in construction and referring to Figures 1 and 2 in describing the heating unit 27, it will be understood that this applies also to the heating unit 26.

The heating unit 27 includes a cylindrical mixing chamber 28 extending transversely in the oven from one side wall thereof to about the middle thereof, where it opens to a housing 29 of a blower 30 driven by an electric motor 31. Mounted within and in spaced relation with respect to the walls of the mixing chamber 28 is a tubular burner housing 32, and extending into housing 32 from its outer end is a burner nozzle 33 for the introduction of a combustible mixture of fuel and air for combustion within the tubular burner housing 32. The hot products of combustion taken from the mixing chamber 28 by the blower 30 are delivered through the duct 34 from the blower housing 29 into the transversely extending header 35, which is disposed subjacent the rearward end of the run 21 of the tray conveyor 17.

Referring now to the heating unit 26 which, as previously stated is similar to the heating unit 27, and is therefore not shown or described in detail, the hot products of combustion are delivered from the blower housing 36 through duct 37 to the transversely extending header 38. The transversely extending header 38 is disposed subjacent the forward portion of the run 22 of the tray conveyor 17. A bank of transversely spaced longitudinally extending flues 39 communicates with the header 38 and projects rearwardly therefrom subjacent the run 22 of tray conveyor 17 to communicate with a transversely extending header 40 subjacent the rearward portion of run 22. By this arrangement the hot combustion gases pass through the bank of flues 39 in the same direction as the products to be baked are transported along the run 22 of the tray conveyor 17. Thus the products to be baked are subjected to a high degree of heat near their point of introduction into the oven where such high degree of heat is desired to compensate for the relatively high absorption of heat energy by the products during the initial portion of the baking operation.

The temperature of the combustion gases from the heater unit 26 drops off quite rapidly as the gases pass through the bank of flues 39 from the header 38 to the header 40, and in order to subject the products to be baked to a high degree of heat throughout their travel in their first lap through the oven, the heating system of the present invention provides means for subjecting the products to a high temperature on the return run 21 of the products in their first lap through the oven.

As above described, the header 35, disposed subjacent the rearward end of the run 21, receives the hot combustion gases from the heating unit 27. A bank of transversely spaced longitudinally extending flues 41 communicates with the header 35 and projects forwardly therefrom subjacent the run 21 of the tray conveyor 17 to communicate with a transversely extending header 42 subjacent the forward portion of run 21. By this arrangement the hot combustion gases pass through the bank of flues 41 in the same direction as the products to be baked are transported along the run 21 of the tray conveyor 17. The products to be baked are thus, subjected to a high degree of heat at the beginning of and along the run 21, so that a high degree of heat is provided for the products to be baked throughout their travel along the upper or first lap of the tray conveyor 17 in the oven.

The combustion gases from the heating unit 26, which as before stated have given up a considerable amount of their heat upon reaching the header 40, are conducted from the ends of the header 40 through ducts 43, disposed between the inner and outer sheets 11 and 12 of the oven side walls, into the ends of a transversely extending header 44. The transversely extending header 44 is disposed subjacent the rearward end of the run 20 of the second or lower lap of the tray conveyor 17 through the oven. A bank of transversely spaced longitudinally extending flues 45 communicates with the header 44 and projects forwardly therefrom subjacent the run 20 to communicate with a transversely extending header 46 disposed below the heating unit 26. The reduced temperature combustion gases pass through the bank of flues 45 in a direction countercurrent with respect to the travel of the products along the run 20 and serve the primary function of colorizing the products, the high temperature combustion gases in the banks of flues 39 and 41 to which the products were previously subjected to in their travel along runs 21 and 22 having effected the main baking operation.

A duct 47 provides communication between the header 46 and the mixing chamber 48 of the heating unit 26, whereby the cooled gases are returned for admixture and recycling with the hot gases of combustion of the heating unit 26 so that the heat energy retained by the gases may be utilized. As is customary, a stack, not shown, is provided for venting a desired amount of the returning gases.

Figure 4:
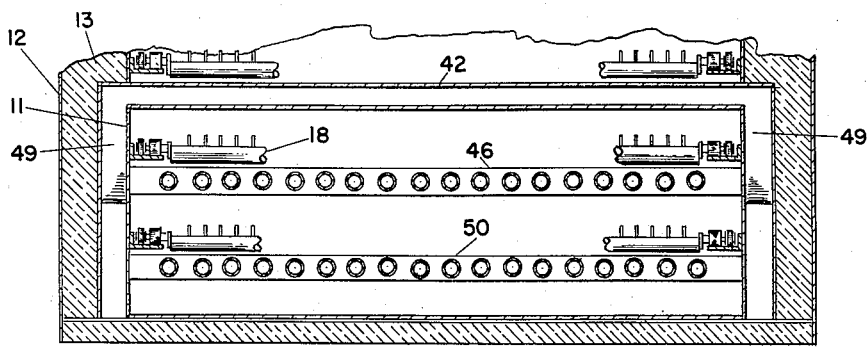
Figure 4 is an enlarged sectional view taken on line 4—4 of Figure 1.
Figure 5:
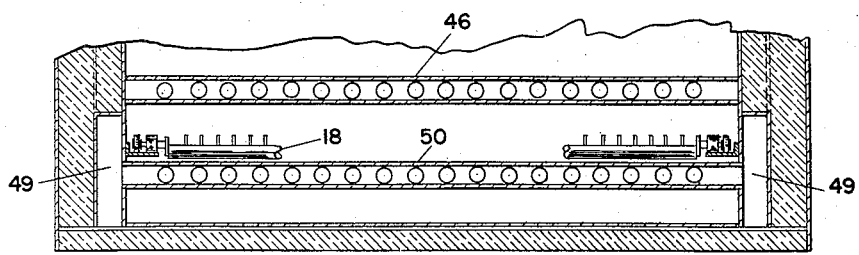
Figure 5 is an enlarged sectional view taken on line 5—5 of Figure 1.

The combustion gases from the heating unit 27, which as previously stated, have given up a considerable amount of their heat upon reaching the header 42, are conducted from the ends of the header 42 through ducts 49, disposed between the inner and outer sheets 11 and 12 of the oven side walls, into the ends of a transversely extending header 50. As is best seen by referring to Figures 1 and 4, the ducts 49 curve downwardly and forwardly in a 90° bend from the opposite ends of the transversely extending header 42, and then extend in a forward direction to communicate with the opposite ends of the transversely extending header 50, as is best seen by referring to Figures 1 and 5. The transversely extending header 50 is disposed subjacent the forward end of the run 19 of the second or lower lap of the tray conveyor 17 through the oven. A bank of transversely spaced longitudinally extending flues 51 communicates with the header 50 and projects forwardly therefrom subjacent the run 19 to communicate with a transversely extending header 52 disposed subjacent the rearward end of the run 19 of the tray conveyor 17. The reduced temperature combustion gases pass through the bank of flues 51 in a direction countercurrent with respect to the travel of the products along the run 19, and similar to the bank of flues 45 serve the primary purpose of colorizing the products.

A duct 53 provides communication between the header 52 and the mixing chamber 28 of the heating unit 27, whereby the cooled gases are returned for admixture and recycling with the hot-combustion gases of the heating unit 27 so that the heat energy retained by the gases may be utilized. As is customary, a stack, not shown, is provided for venting a desired amount of the returning gases.

It will be seen that the products to be baked are subjected to a high degree of heat relatively close to the point of introduction into the oven where the greatest amount of heat is desired to compensate for the relatively high absorption of heat energy by the products, and a high degree of heat is maintained throughout the travel of the products in their first lap through the oven along successive runs 22 and 21, where a high degree of heat is desired to maintain the products at baking temperatures.

I claim:

1. In a double lap oven, an endless tray conveyor for carrying products to be baked through said oven and having an upper and lower horizontally extending run forming a first lap and an upper and lower horizontally extending run forming a second lap, the upper run of said first lap of the tray conveyor moving the products to be baked in a first pass lengthwise of the oven in one direction and the lower run of said first lap of the tray conveyor moving the products to be baked in a second pass lengthwise of the oven in the opposite direction, each of the runs of said laps having subjacent thereto an associated bank of heating flues, a source of hot combustion gases at each end of said oven, means connecting one of said sources with an end of the bank of flues associated with the upper run of the first lap of said tray conveyor for flowing the gases therethrough in the direction of travel of the products to be baked in their first pass through the oven along said upper run of said first lap of the tray conveyor, means connecting the other end of said sources with an end of the bank of flues associated with the lower run of the first lap of said tray conveyor for flowing the gases therethrough in the direction of travel of the products to be baked in their second pass through the oven along said lower run of said first lap of the tray conveyor, and duct means connecting the discharge ends of the respective banks of flues associated with the runs of the first lap of the tray conveyor with respective banks of flues associated with the runs of the second lap of the tray conveyor.

2. In a double lap oven, endless tray conveying means for carrying products to be baked in a double lap through said oven including a first lap having superimposed upper and lower runs and a second lap having superimposed upper and lower runs, a first closed heating system including a heating unit at the forward end of said oven for supplying hot combustion gases, a bank of flues subjacent one run of the first lap of said tray conveyor communicating at one end with the discharge side of said heating unit for flowing the combustion gases through said bank of flues in the direction of travel of the products transported by said conveying means along said one run of the first conveyor lap, a return bank of flues subjacent one run of the second lap of said tray conveyor for returning the combustion gases to said heating unit and means providing communication between the discharge end of said first bank of flues and one end of said return bank of flues and between the other end of said return bank of flues and said heating unit; and a second closed heating system including a heating unit at the rearward end of the oven for supplying hot combustion gases, a bank of flues subjacent the other run of the first lap of said tray conveyor communicating at one end with the discharge side of said last named heating unit for flowing the combustion gases through said last named bank of flues in the direction of travel of the products transported by said conveying means along said last named run, a return bank of flues subjacent another run of the second lap of said tray conveyor for returning the combustion gases to said last named heating unit and means providing communication between the discharge end of the bank of flues subjacent the said other run of the first lap of said tray conveying means and one end of said last named return bank of flues and between the other end of said last named return bank of flues and said last named heating unit.

3. In a double lap oven, endless tray conveying means for carrying products to be baked in a double lap through said oven in four superimposed runs including a first run for moving the said products in a first pass lengthwise of the oven in one direction and a second run for moving the said products in a second pass lengthwise of the oven in the opposite direction, a bank of heating flues subjacent each of said four runs of said endless tray conveying means, means for supplying hot combustion gases in separate streams to each of the banks of flues subjacent the said first and second runs of said tray conveying means at the inlet ends of said banks of flues for flowing the hot combustion gases therethrough in the direction of travel of the products in the passes along said first and second runs of said tray conveying means, and separate duct means each connecting the discharge end of one of the banks of flues subjacent said first and second runs of the endless tray conveyor, with the inlet end of a respective one of the remaining two banks of flues for flowing the combustion gases therethrough in a direction opposite the direction of travel of the products along the runs of the tray conveyor associated with each of said remaining banks of flues.

References Cited in the file of this patent

UNITED STATES PATENTS 1,882,107  Wundrack _____ Oct. 11, 1932